United States Patent
Farber (10) Patent No.: US 9,262,940 B2
(45) Date of Patent: Feb. 16, 2016

(54) MUSICAL NOTATION INTERFACE FOR THE VISUALLY IMPAIRED

(71) Applicant: Shlomo Michael Farber, Portland, OR (US)

(72) Inventor: Shlomo Michael Farber, Portland, OR (US)

( * ) Notice: Subject to any disclaimer, the term of this patent is extended or adjusted under 35 U.S.C. 154(b) by 0 days.

(21) Appl. No.: 14/555,609

(22) Filed: Nov. 27, 2014

(65) Prior Publication Data

US 2015/0143975 A1    May 28, 2015

Related U.S. Application Data

(60) Provisional application No. 61/910,040, filed on Nov. 28, 2013.

(51) Int. Cl.
*G09B 15/04* (2006.01)

(52) U.S. Cl.
CPC ........................................ *G09B 15/04* (2013.01)

(58) Field of Classification Search
CPC ........................................................ G09B 15/04
See application file for complete search history.

(56) References Cited

U.S. PATENT DOCUMENTS

| | | | | |
|---|---|---|---|---|
| 4,043,241 A * | 8/1977 | Liu | ...................... | A43B 3/0021 36/139 |
| 4,613,139 A * | 9/1986 | Robinson, II | ........... | G06F 3/014 200/DIG. 2 |
| 4,635,516 A * | 1/1987 | Giannini | .................. | G10H 1/32 2/160 |
| 4,753,146 A * | 6/1988 | Seiler | ..................... | G10H 1/348 84/730 |
| 5,338,891 A * | 8/1994 | Masubuchi | .......... | G10H 1/0558 84/600 |
| 5,581,484 A * | 12/1996 | Prince | ..................... | G06F 3/014 340/407.1 |
| 6,819,771 B2 * | 11/2004 | Menzies | ................ | H04R 5/023 381/301 |
| 7,381,884 B1 * | 6/2008 | Atakhanian | .............. | G10H 1/34 84/477 R |
| 7,674,969 B2 * | 3/2010 | Xu | .......................... | G10H 1/24 84/615 |
| 7,688,305 B2 * | 3/2010 | Nishi | ...................... | G06F 3/014 341/20 |
| 7,737,942 B2 * | 6/2010 | Bajramovic | ............ | G06F 1/163 345/156 |
| 7,763,790 B2 | 7/2010 | Robledo | | |
| 7,842,879 B1 * | 11/2010 | Carter | ..................... | G10H 3/143 84/600 |

(Continued)

FOREIGN PATENT DOCUMENTS

CA      2235844 C      5/1997
DE  102011114284 A1   3/2013

(Continued)

OTHER PUBLICATIONS

"Exploring Sensory Substitution Techniques: Crossmodal Audio-Tactile displays—Using the skin to hear", Tutorial Proposal for ACHI 2010, Feb. 10, 2010, The Third International Conference on Advances in Computer-Human Interactions.

(Continued)

*Primary Examiner* — Robert W Horn
(74) *Attorney, Agent, or Firm* — Dr. Hanan Farber Patent Agent Ltd.

(57) ABSTRACT

Various systems to aid a visually impaired musician to learn musical notation. The system includes a microprocessor with a memory adapted to store musical notation. Multiple transducers are operatively attached to the microprocessor. The transducers are spatially located on and/or in contact with a part of the body of the visually impaired musician. Responsive to the musical notation, the microprocessor is configured to signal the transducers to provide a physical or tactile sensation to the part of the body of the visually impaired musician.

20 Claims, 7 Drawing Sheets

(56) References Cited

U.S. PATENT DOCUMENTS

| | | | |
|---|---|---|---|
| 8,362,350 B2* | 1/2013 | Kockovic | G10H 1/34 84/743 |
| 8,872,011 B2* | 10/2014 | Fresolone | G09B 21/009 84/483.2 |
| 9,104,271 B1* | 8/2015 | Adams | G06F 3/0426 |
| 2007/0166693 A1 | 7/2007 | Blas et al. | |
| 2007/0242040 A1 | 10/2007 | Ullrich et al. | |
| 2008/0307945 A1 | 12/2008 | Gatzsche et al. | |
| 2008/0307946 A1 | 12/2008 | Machell | |
| 2013/0162416 A1 | 6/2013 | Churovich | |
| 2013/0321317 A1* | 12/2013 | Hirukawa | G06F 3/016 345/173 |
| 2015/0143975 A1* | 5/2015 | Farber | G09B 15/04 84/483.2 |
| 2015/0242083 A1* | 8/2015 | Rainisto | G06F 3/0485 715/784 |

FOREIGN PATENT DOCUMENTS

| | | |
|---|---|---|
| JP | 200852231 A | 3/2008 |
| WO | 9608804 A1 | 3/1996 |
| WO | 9716035 A1 | 5/1997 |

OTHER PUBLICATIONS

Learn New Skills With Superhuman Speed, IEEE Spectrum, "Wearable computers could provide the muscle memory to learn guitar chords or dance steps", By Ariel Bleicher, Posted May 28, 2014 | 19:00 GMT.

UK Intellectual Property Office, Combined search and Examination Report under Sections 17 & 18(3), Jul. 15, 2015, GB1421068.6.

Musitek, SmartScore X2, Piano edition description from website: http://www.musitek.com/smartscore-piano.html, printout of website page taken Sep. 24, 2015.

* cited by examiner

MUSICAL NOTATION INTERFACE FOR THE VISUALLY IMPAIRED

CROSS REFERENCE TO RELATED APPLICATIONS

The present application claims priority from provisional patent application 61/910,040 filed 28 Nov. 2013 in the United States Patent and Trademark Office by the present inventor, the disclosure of which is incorporated herein by reference.

BACKGROUND

1. Technical Field

Aspects of the present invention relate to a musical notation device which enables the visually impaired to read music.

2. Description of Related Art

Visual impaired musicians find themselves in a challenging situation when trying to master existing musical compositions. Repertoire of visually impaired musicians may be limited to works available as Braille sheet music. Braille sheet music is read tactilely by the musician's hand(s) thus it is impossible to read the Braille sheet music while playing most instruments. Instrumental performance by a visually impaired musician is performed from memory.

Thus there is a need for and it would be advantageous to have a system and method for visually impaired musicians to read musical notation by tactile sensation while playing.

MIDI (Musical Instrument Digital Interface) is a technical standard that describes a protocol, digital interface and connectors and allows a wide variety of electronic musical instruments, computers and other related devices to connect and communicate with one another. A single MIDI link can carry up to sixteen channels of information, each of which can be routed to a separate device. MIDI carries event messages that specify notation, pitch and velocity, control signals for parameters such as volume, vibrato, audio panning, cues, and clock signals that set and synchronize tempo between multiple devices. The messages are sent to other devices and control sound generation and other features. The message data can also be recorded into a hardware or software device called a sequencer, which can be used to edit the data and to play it back at a later time. MIDI technology was standardized in 1983 by a panel of music industry representatives, and is maintained by the MIDI Manufacturers Association (MMA). All official MIDI standards are jointly developed and published by the MMA in Los Angeles, Calif., USA, and for Japan, the MIDI Committee of the Association of Musical Electronics Industry (AMEI) in Tokyo.

Electrotactile or electrocutaneous systems are also known for delivering electrical current to electrodes placed on the user's skin to induce a tactile response. U.S. Pat. No. 4,926,879, Sevrain et al., dated May 22, 1990 describes an electrotactile stimulator including a flexible substrate on one surface of which is formed an electrically conductive pattern having a number of electrodes which are placed in contact with a skin surface of a user.

BRIEF SUMMARY

Various systems are provided for herein to aid a visually impaired musician to learn musical notation. The system includes a microprocessor with a memory adapted to store musical notation. Multiple transducers are operatively attached to the microprocessor. The transducers are spatially located on and/or in contact with a part of the body of the visually impaired musician. Responsive to the musical notation, the microprocessor is configured to signal the transducers to provide a physical or tactile sensation to the part of the body of the visually impaired musician. The part of the body of the visually impaired musician is a foot of the visually impaired musician. The five toes of the foot may correspond to the five lines of a musical staff. The part of the body of the visually impaired musician may alternatively be an arm, a leg, a toe, a head or a torso. The transducers may be spatially distributed and located on multiple locations on the tips of toes, under toes, on the top of toes, between toes, on an edge of the sole of a foot, on the sole of a foot, on the upper surface of the foot, on an ankle or on a lower leg below a knee for example. The transducers may be spatially located and held in place by a sock or shoe adapted to be worn on a foot of the visually impaired musician.

A camera may be operatively attached to the processor to input printed musical notes in the field of view of visually impaired musician, and to recognize and store the printed musical notes in a suitable format in the memory. A speaker may allow the visually impaired musician to hear the notes played out loud as represented by the musical notation. A microphone may be configured to record the playing of the visually impaired musician and to provide a subsequent feedback to the visually impaired musician. The subsequent feedback may be an incorrect note, incorrect pitch of a note or incorrect note duration.

Various methods are provided for herein for a visually impaired person to learn musical notation by using a system which includes a microprocessor with a memory adapted to store the musical notation and multiple transducers operatively attached to the microprocessor. The transducers are attached to be in respective contact with multiple locations on a body part of the visually impaired musician. The musical notation is transduced into tactile sensations on the body part of the visually impaired musician.

Tactile sensations on the body part of the visually impaired musician at the respective locations may be provided while the system sounds the musical notation through a speaker or headphone operatively attached to the microprocessor to accustom the visually impaired musician to the tactile sensations corresponding to the musical notation. Notes of a first time interval, e.g measure, may be transduced and in response the visually impaired musician plays the notes of the first time interval. The sound of the notes played by the visually impaired musician may be monitored. The system may wait until the visually impaired musician finishes playing the notes of the first time interval and then notes of the next time interval may then be transduced.

When two hands are used to play the musical notation on a keyboard instrument a speaker or headphone may be operatively attached to the microprocessor to audibly sound the notes played to the visually impaired musician which correspond to one hand. When audibly sounding the notes which correspond to one hand, tactile sensations may be transduced on the body part of the visually impaired musician for the musical notation of the other hand.

A segment of the music notation may be selected while looping repetitively to the beginning of the segment. Random musical notes may be generated with or without corresponding audible sound to train the visually impaired musician.

Sound being played by the visually impaired musician may be recorded and stored responsive to the musical notation transduced into tactile sensations on the body part of the visually impaired musician. The notes played by the visually impaired musician may be compared with the musical notation. Feedback which may be audible or tactile may be provided to the visually impaired musician which is responsive to the comparison between notes played by the visually impaired musician and the musical notation. The feedback may be a notification to the visually impaired musician of an incorrect note, incorrect pitch of a note or an incorrect note duration. The feedback may be during the playing of the visually impaired musician or feedback may be after the playing of the visually impaired musician.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein.

DETAILED DESCRIPTION

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

By way of introduction, embodiments of the present invention are directed to a musical notation interface for the visually impaired. The musical notation interface is designed to render musical notation accessible to visually impaired individuals by tactile sensation. The musical notation interface according to various embodiments of the present invention enables the visually impaired musician to read musical notation by tactile sensation while playing with both hands a musical instrument such as a keyboard instrument without having to repetitively interrupt playing to read the next portion of Braille notation by hand touching to memorize the notes and to return the hands back to the instrument to continue playing. The musical notation interface according to embodiments of the present invention intends to provide a new musical opportunities for the visually impaired musician.

Figure 1:
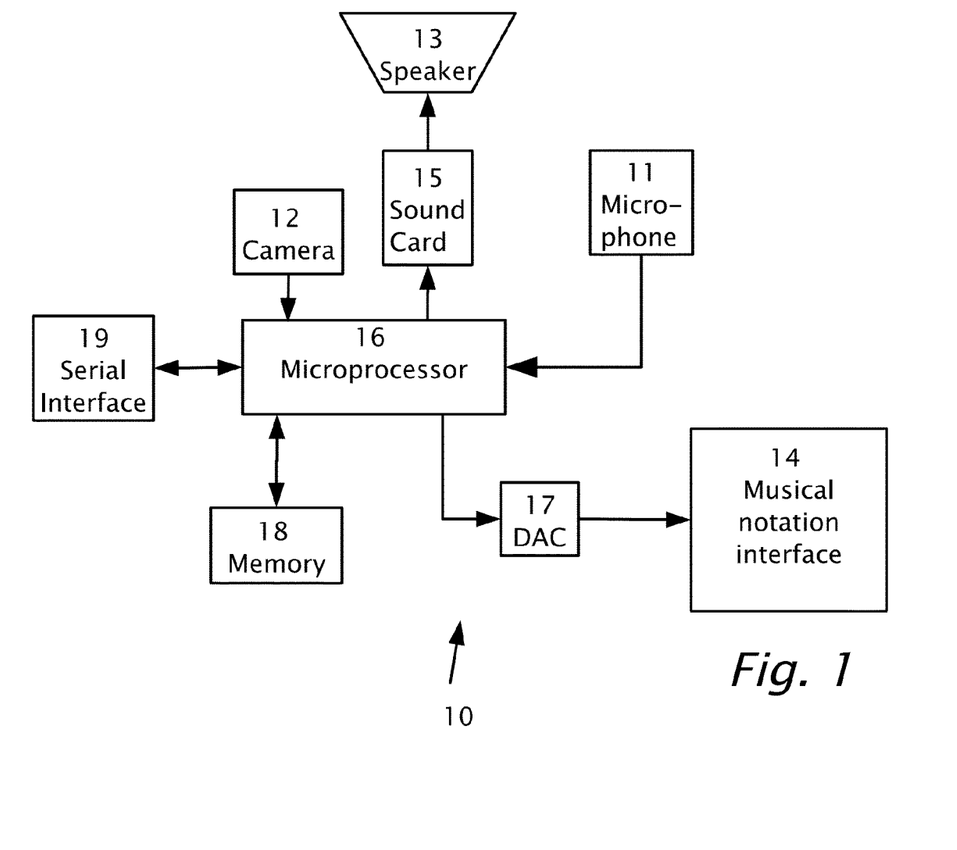
FIG. 1 shows a block diagram of a system, according to features of the present invention.

Referring now to the drawings, reference is now made to FIG. 1 which shows a block diagram of a system 10, according to features of the present invention. System 10 includes a microprocessor 16 connected to: memory 18, a camera 12, a sound card 15 which connects to a speaker 13, a microphone 11 and a serial interface 19 which may be RS232™, Universal Serial Bus (USB™) or IEEE 1394 (FireWire™) interface for example. Examples of systems 10 include a Raspberry Pi™ which is a credit-card sized computer or Teensy™ USB Development Board (PJRC.COM, LLC. 14723 SW Brooke CT, Sherwood, Oreg. 97140 USA).

Microprocessor 16 outputs signals to a musical notation interface 14 via a digital to analogue converter (DAC) 17 by converting musical notation stored in memory 18 to tactile sensations on a body part, e.g. feet, of the visually impaired musician. The visually impaired musician "reads" or learns the musical notes by tactilely sensing the notes on the body part. Musical notation interface 14 may receive different formats of musical data such as MIDI encoding or a proprietary encoding from microprocessor 16 via digital to analogue converter (DAC) 17.

Camera 12 or a scanner (not shown) may be used to input conventional printed musical notes, interpret the notes and store the notes in memory. Camera 12 may have sheet music in field of view. The sheet music may be located on a music stand or the music stand of a keyboard instrument being played by the visually impaired musician. Alternatively, camera 12 may be wearable by the visually impaired person while playing an instrument.

In order to facilitate real-time "reading" or learning of musical notation, camera 12 may be configured to image capture the notes, interpret the notes and microprocessor 16 may output signals to musical notation interface 14 by transducing the notes in real time into tactile sensations on the body part.

System 10 may connect via serial interface 19 either to another electronic device, e.g. computer system and/or mobile computer system such as a smart-phone, laptop computer, a tablet computer, and/or a MIDI controlled instrument. The other electronic device may load memory 18 with notes for subsequent use by musical notation interface 14.

In addition to being able to connect with various devices, microprocessor 16 may be configured to audibly transmit (optionally via a headset, not shown in FIG. 1) to the visually impaired musician text instructions expressing articulation, tempo or dynamics. By processing sound input from microphone 11, processor 16 may be programmed to provide feedback to the visually impaired musician involving corrections of notes, for example if an incorrect pitch or note duration is sounded.

System 10 may provide various modes of operation to the visually impaired musician:

Playback mode—Playback mode plays the music on a body part of the visually impaired musician using musical notation interface 14 either silently or with the music sounding from speaker 13 in order to give the visually impaired musician an idea of what the piece sounds like and to accustom the musician to the tactile sensations corresponding to the music.

Stand-by mode—System 10 transduces notes of one time interval, e.g. beat or measure on musical notation interface 14 and by sensing sound on microphone 11 waits until the musician plays the notes before transducing the notes of the next time interval, e.g. beat or measure, on musical notation interface 14.

Hands separate mode—For a keyboard instrument, e.g. piano, in which two hands are used to playing, system 10 sounds the notes corresponding to one hand, with or without the corresponding tactile sensation transduction. The musician may play the other hand accompanying the sounds by "reading" the tactile sensations.

Passage selection mode—The visually impaired musician may select a small segment of the music which loops repetitively so that the visually impaired musician may work on the selected passage conveniently without having to rewind manually.

Reading practice mode—system 10 may generate random note transmissions including tactile transductions with or without corresponding sound to train the player with system 10.

Figure 2:
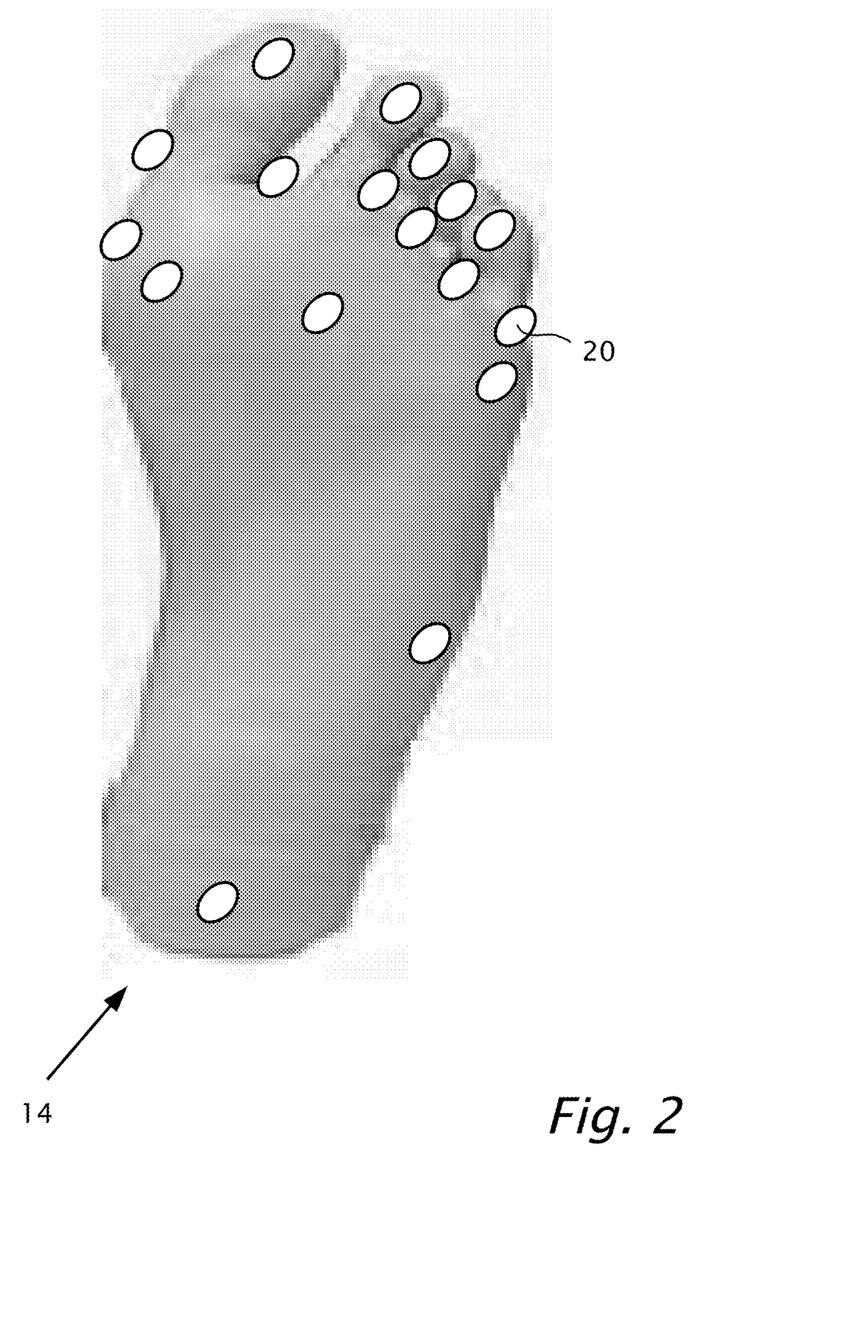
FIG. 2 shows examples of positions on a foot which may be used for transduction of musical notation, according to a feature of the present invention.
Figure 8A:
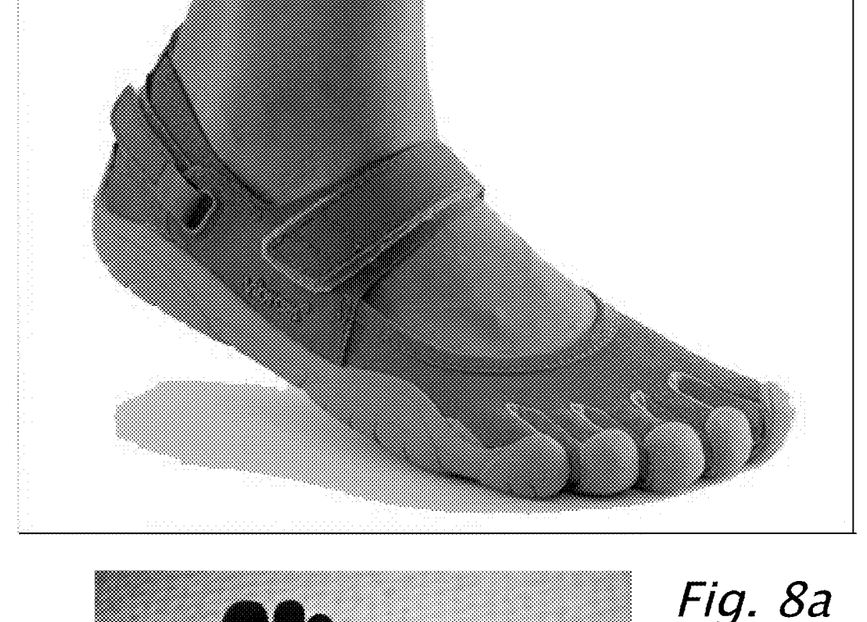
FIG. 8a shows a picture of a five toe shoe, according to a feature of the present invention.
Figure 8B:
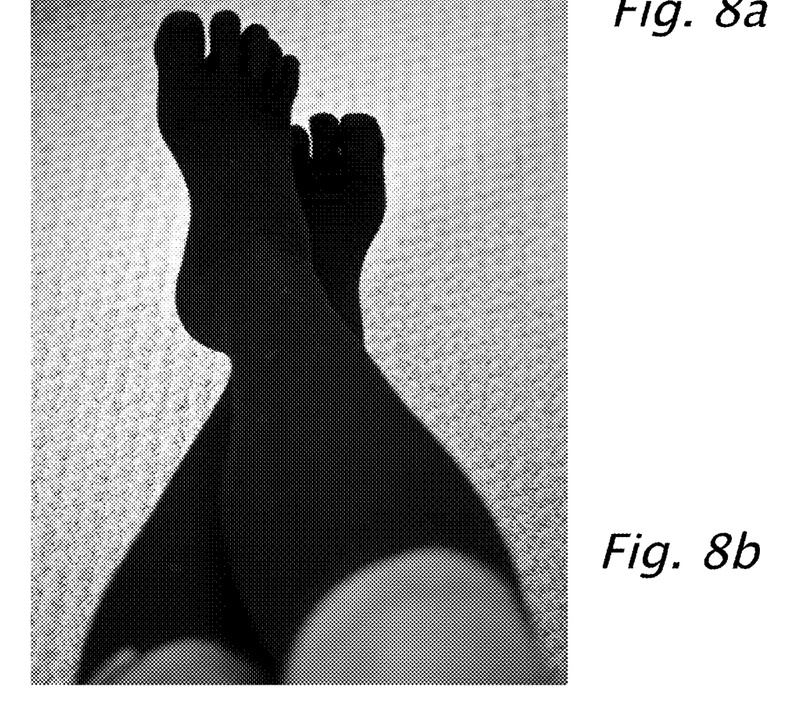
FIG. 8b shows a picture of a five toe sock, according to a feature of the present invention.

Reference is now made to FIG. 2 which shows examples of positions on a foot which may be used for transduction of musical notation, according to a feature of the present invention. A number of transducers 20 may be located on the sole of a foot of a visually impaired player of a musical instrument, e.g keyboard instrument. Transducers 20 are schematically shown for example located on the tips of toes, under or on top of toes, in between toes and/or along the edge of the sole of the foot or in various other places on the sole of the foot. Transducers 20 may also be located on the other foot of the visually impaired player on the upper surface of the foot or even further up on the ankle and lower leg to just below the knee. Transducers 20 may be held in place with a five toe shoe (see FIG. 8*a*), be an integral part of the five toe sock (see FIG. 8*b*) or transducers 20 may be integrated into a device that allows a foot of the visually impaired player to rest on the device so that transducers 20 are in physical and/or electrical contact with the skin of the feet of the visually impaired musician. There may be several points on and between the toes that transducers 20 may stimulate simultaneously. Transducers 20 may implemented using a vibration motor (Part No. ROB-08449, Precision Microdrives Limited, Unit 23, Cannon Wharf, 35 Evelyn Street, London, SE8 SRT, UK) in contact with the skin of the feet of the visually impaired player. Another example of a vibration motor is Shaftless Vibration Motor 10×2.0 mm (Pololu Corporation, 920 Pilot Rd., Las Vegas, Nev. 89119 USA). The vibration motor providing a vibration sensation to the tips of toes, in between toes and/or along the edge of the sole of the foot. Alternatively, transducers 20 may be electrodes which induce a tactile response by delivering electrical current to the skin of the feet electrocutaneously. Numerous transducers 20 may derive power from additional power circuitry connected to or included in musical notation interface 14 and/or DAC 17.

Figure 3A:
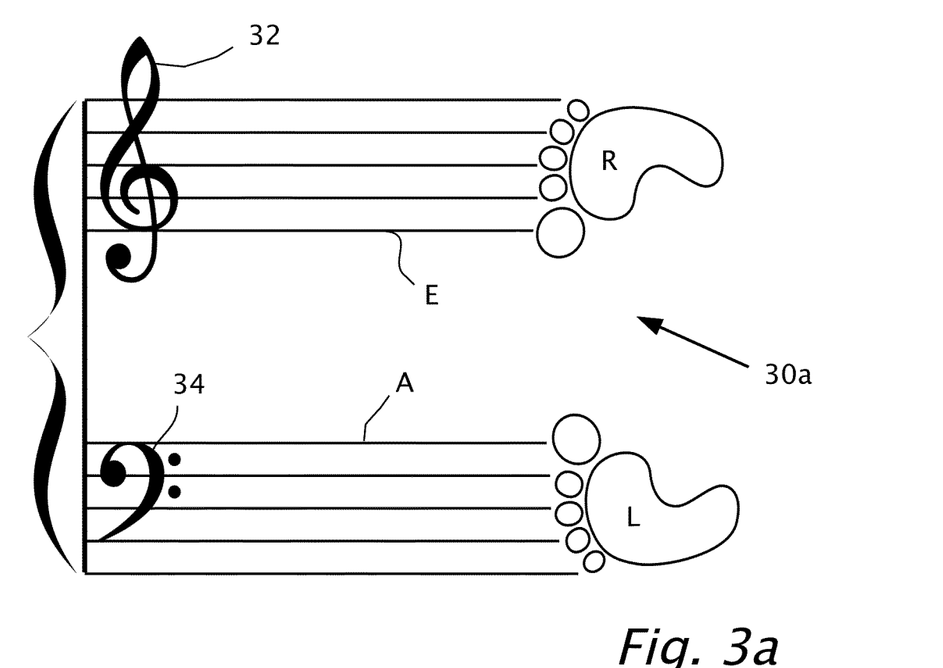
FIG. 3a shows further details of encoding of musical notation onto positions on a musician's feet, according to a feature of the present invention.

Reference is now made to FIG. 3*a* which shows a diagram 30*a* of an example of encoding of musical notation onto positions on a musician's feet, according to a feature of the present invention. The encoding shows how the five toes of a foot generally correspond to five lines of a musical staff. For example, the note on the first line of a staff in treble or G clef 32 (note E) may be transduced by nerve stimulation on the big toe (or the hallux) of the right (R) foot via a transducer 20 located on the big toe of the right (R) foot. The note on the fifth line of a Bass or F-clef 34 (note A) may be transduced by a nerve stimulation on the big toe of the left (L) foot via another transducer 20 located on the big toe of the left (L) foot. For instrumentalists that use one musical staff only, one foot may be used to play the current note(s) and the other foot may enable the player to "look forward", i.e. be aware of the notes which are about to be played.

Figure 3B:
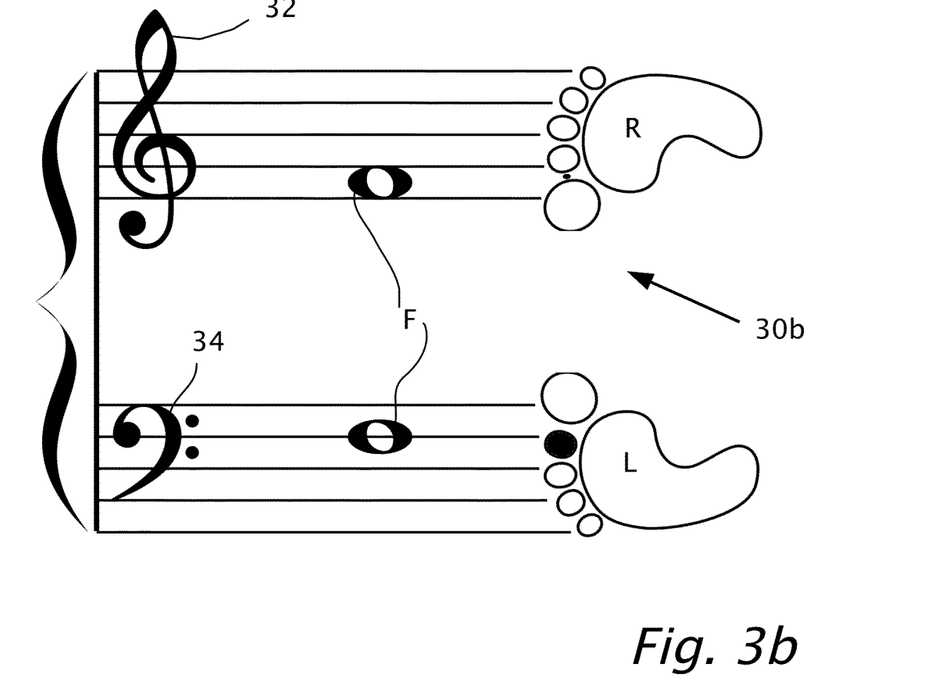
FIG. 3b shows further details of encoding of musical notation onto positions on a musician's feet, according to other features of the present invention.

Reference is now made to FIG. 3*b* which shows a diagram 30*b* of an example of encoding of musical notation onto positions on a musician's feet according to a feature of the present invention. The encoding includes how the five toes of a foot may in general correspond to five lines of a musical staff. For example, between the first line and the second line of a G-clef 32 (note F) is a possible tactile and/or nerve stimulation between the big or first toe of the right (R) foot and the second toe via a transducer 20 located on the web between the big toe and the second toe of the right (R) foot. On the fourth line (from bottom line) of a F-clef 34 (note F) is a possible nerve stimulation on the second toe of the left (L) foot via another transducer 20 located on the second toe of the left (L) foot.

Figure 4:
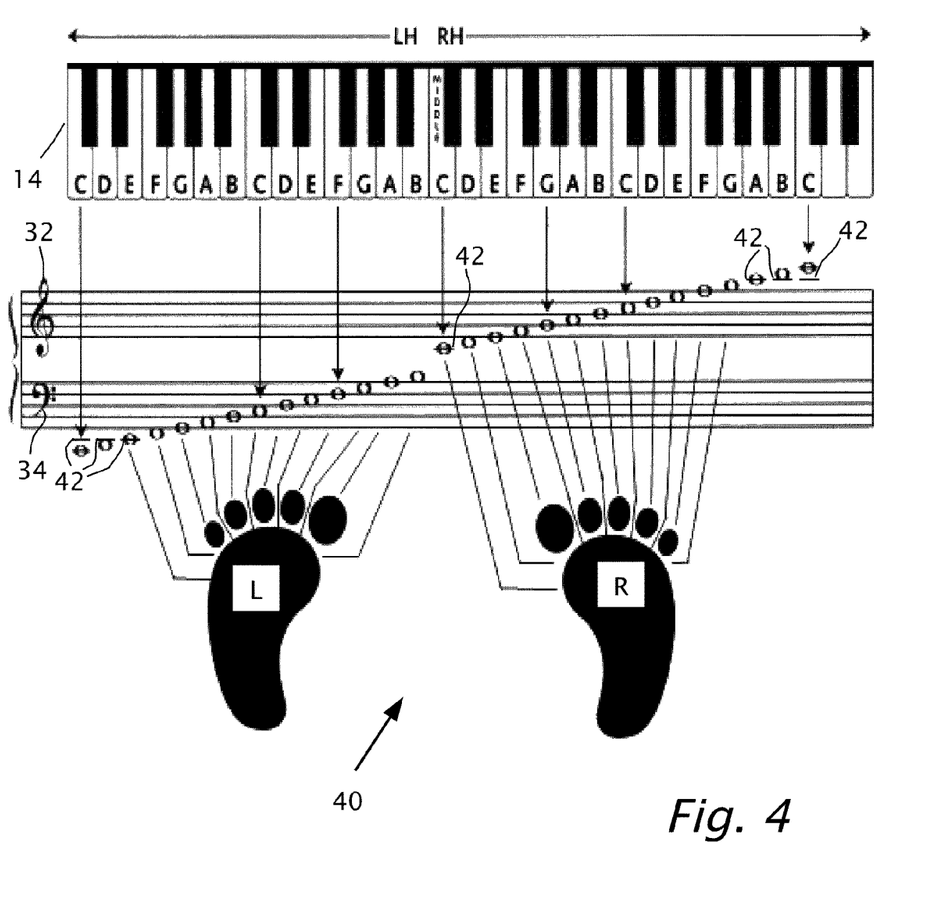
FIG. 4 shows a diagram of encoding of musical notation onto positions on a musician's feet, for a diatonic scale of a keyboard, according to a feature of the present invention.

Reference is now made to FIG. 4 a diagram 40 which shows an example of an encoding for a diatonic scale, according to a feature of the present invention. Nerve or tactile stimulation may be provided using via transducers 20 placed on specific encoded locations of right R and left L feet of a visually impaired musician.

Diagram 40 includes a correspondence between the keys of keyboard instrument, the musical notation for G-clef 32, F-clef 34 and an example of encoding of left foot L and right foot R which specifies locations of transducers 20 (not shown) on left L and right R feet. Left foot L is shown encoded for notes on the lower staff in F-clef. Right foot R is shown encoded for notes on the upper staff in G-clef. Note G which is on the lowest line on the F clef is encoded onto the fifth toe of left foot L, note B which falls on the second line (from the bottom) is encoded onto the 4th toe of the left foot, and so on with the upper note A which falls on the top line of the F-clef staff encoded onto the first toe of left foot L.

Similarly, the spaces between the toes are used to encode the notes which fall on spaces between the lines of the staffs. For instance, the note low A which is the space between the two lower lines of the F-clef staff is encoded onto the space between the fifth toe and the fourth toe of left foot. Upper G which is in the space between the fourth line and the fifth line (from the bottom) of F-clef staff is encoded in the space between the second and first toes of the left foot L.

Additional lines are used to indicate notes above or below the five lines of the musical staff; these additional lines are known as ledger lines. Diagram 40 further includes the provision for notes which employ ledger lines 42. An example is shown with reference 42 on middle C below G-clef (upper staff). The notes for ledger lines 42 may be encoded on the outside and inside edges of the right (R) and left (L) feet. For example, on the F-clef (lower) staff, notes low E and F on ledger lines 42 below the staff are encoded to the right side of left foot L.

Figure 5:
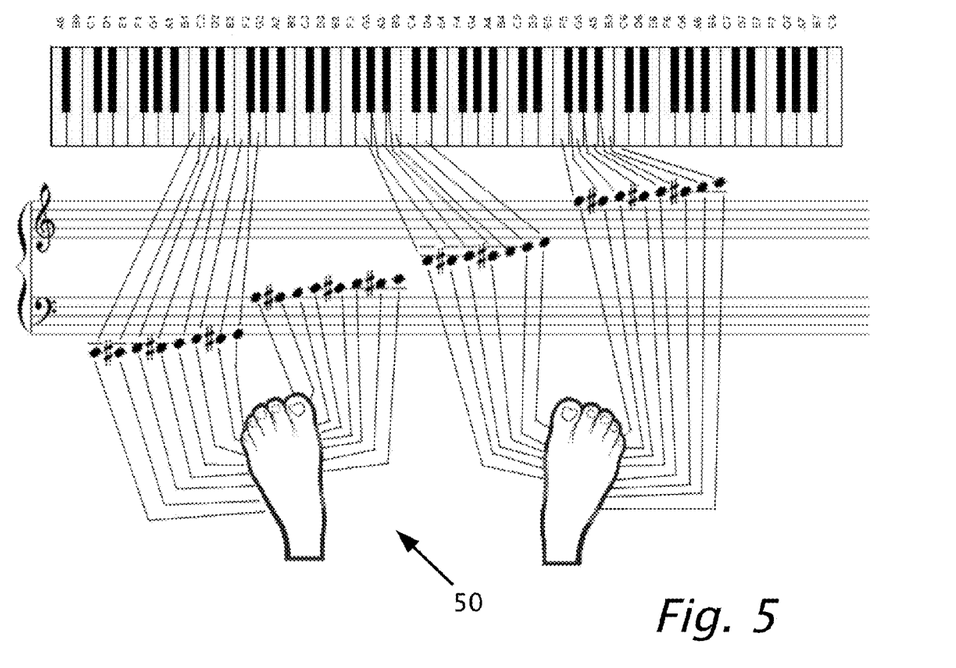
FIG. 5 shows a diagram of encoding of ledger lines onto positions on a musician's feet, for a chromatic scale, according to a feature of the present invention.

Reference is now made to FIG. 5 which shows a diagram 50 of another example of encoding of ledger lines onto positions on a musician's feet, according to a feature of the present invention. Diagram 50 shows an example for encoding sharp notes. Flat notes may be similarly encoded however, flat notes are not used in MIDI protocol and may be superfluous in some embodiments of the invention.

The notes which are on ledger lines below the lower staff F-clef are shown encoded on the left side of left foot L. Notes that are lower are progressively encoded on the left side of the left foot toward the ankle.

The notes which are on ledger lines above the lower staff (F-clef) are shown encoded on the right side of left foot L with notes that are higher are progressively encoded on the right side of the left foot toward the ankle.

Similarly, the left side of the right foot R is encoded for notes on ledger lines that are below the upper staff G-clef. The right side of right foot R is encoded for notes on ledger lines that are above the upper staff G-clef.

Figure 6:
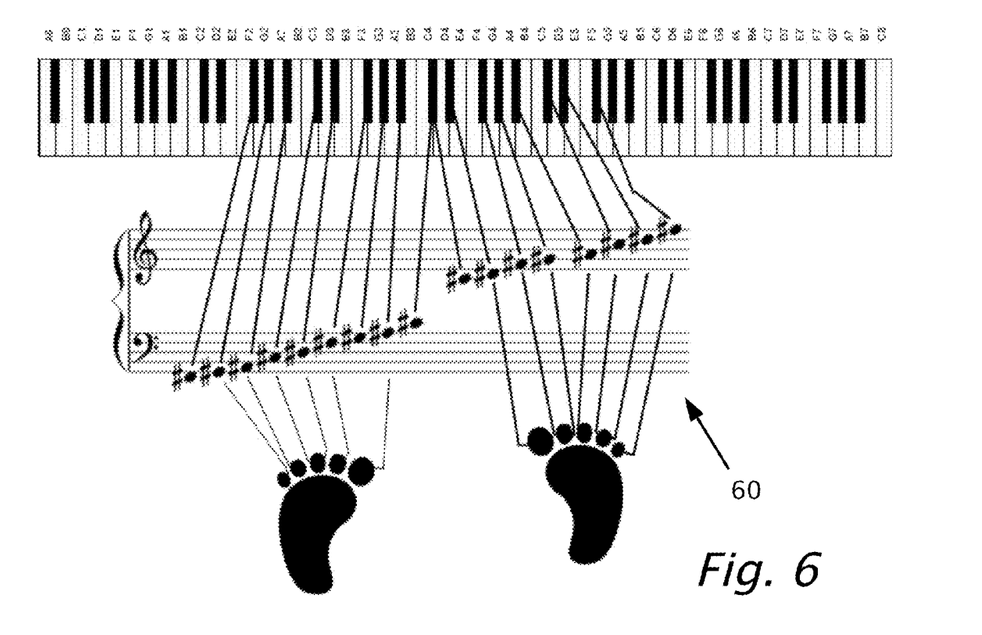
FIG. 6 shows a diagram of encoding of musical notation onto positions on a musician's feet, for sharp notes, according to a feature of the present invention.

Reference is now made to FIG. 6 which shows a diagram 60 of a feet encoding for sharp notes corresponding to the black keys of a keyboard, according to a feature of the present invention. The sharp notes are shown in the encoding are transduced by pressure or nerve stimulation to the sides of the toes on the right (R) and left (L) feet respectively.

Figure 7:
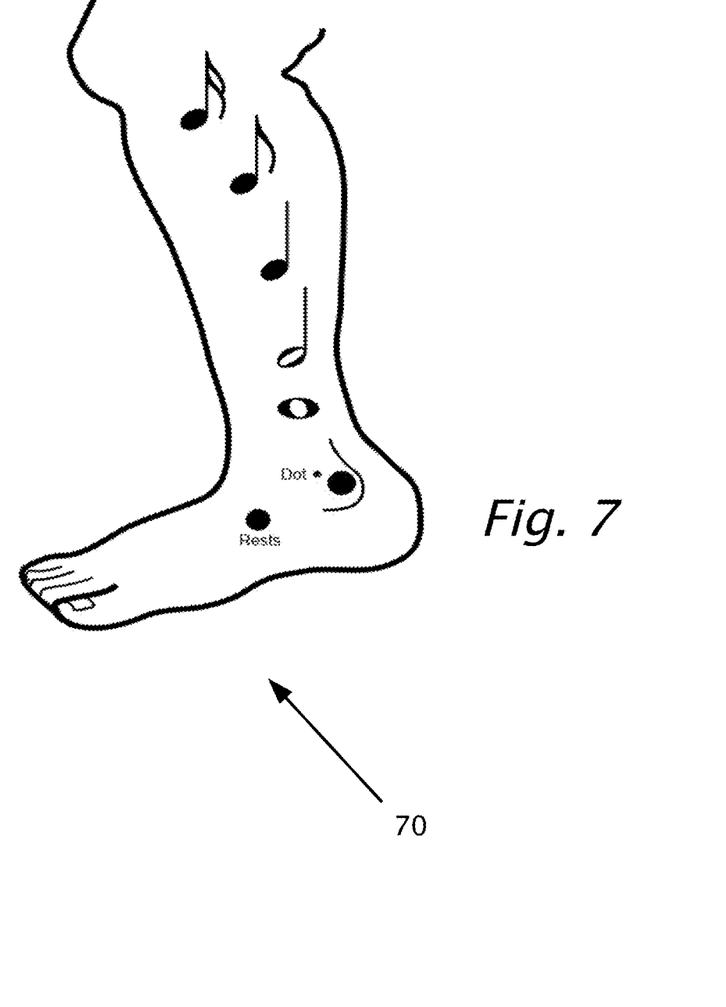
FIG. 7 shows a diagram of positions on a foot and/or a leg for encoding lengths of notes and/or rests, according to a feature of the present invention.

Reference is now made to FIG. 7 which shows a diagram 70 of a foot and a leg, according to a feature of the present invention. Rhythm Data (the length of each note) may be transduced to the side of the legs as shown. Transducers 20 may cover the nerve regions up to the knee having the longest note-length closest to the floor and the shortest closer to the knee.

On complex music there may be the option of transmitting to transducers 20 up to four different lines in the same time, thus having Bass+Tenor on left leg and with lower voices played by left hand for example and Alto+Soprano with upper voices played by the right hand on the right leg for example. Dynamics and articulation parameters could also be transmitted also through other body parts such as the thigh or to the chest.

The term "diatonic scale" or heptatonia prima as used herein refers to an eight-note musical scale composed of seven pitches and a repeated octave. The diatonic scale includes five whole steps and two half steps for each octave, in which the two half steps are separated from each other by either two or three whole steps, depending on their position in the scale. This pattern ensures that, in a diatonic scale spanning more than one octave, all the half steps are maximally separated from each other (i.e. separated by at least two whole steps).

To understand tactile sensory substitution it is essential to understand some basic physiology of the tactile receptors of the skin. There are five basic types of tactile receptors: Pacinian corpuscle, Meissner's corpuscle, Ruffini endings, Merkel nerve endings, and free nerve endings. These receptors are mainly characterized by which type of stimuli best activates them, and by their rate of adaptation to sustained stimuli. Because of the rapid adaptation of some of these receptors to sustained stimuli, some receptors may require rapidly changing tactile stimulation systems in order to be optimally activated.

There have been two different types of stimulators used for tactile sensory substitution. electrotactile or vibrotactile. Electrotactile stimulators use direct electrical stimulation of the nerve ending in the skin to initiate the action potentials; the sensation triggered, burn, itch, pain, pressure etc. depends on the stimulating voltage. Vibrotactile stimulators use pressure and the properties of the mechanoreceptors of the skin to initiate action potentials. With the electrotactile stimulating systems many factors may affect the sensation triggered: stimulating voltage, current, waveform, electrode size, material, contact force, skin location, thickness and hydration.

Electrotactile stimulation may involve the direct stimulation of the nerves (percutaneous), or through the skin (transcutaneous). Furthermore, stimulation of the skin without insertion may require high voltage stimulation because of the high impedance of the dry skin or hydration of the skin.

The terms "user", "musician" or "visually impaired musician" are used herein interchangeably.

The terms "speaker" and "headphones" are used herein interchangeably.

The term "learn" as used herein refers to the ability of a visually impaired person to acquire musical notation in real time for the purpose of playing, singing or otherwise performing the music as represented in the musical notation. The term "learn" is analogous to "read" and/or "sight-read" which is appropriate for a sighted person. Nevertheless, the terms "learn" and "read" are used herein interchangeably when referring to a visually impaired person and the learning/reading is accomplished through tactile sensations.

The term "time interval" as used herein refers to time intervals as commonly used in musical notation measured in beats and/or measures assuming a given rhythm measured for instance in beats per minute and a given time signature.

The term "transduce" (or "transducer") as used herein refers to the conversion of energy from one form to another, including but not limited to the transduction of electrical energy to pressure, vibration and/or heat. The term "transduce" as used herein may also refer to direct electrical stimulation of nerves.

The indefinite articles "a", "an" as used herein have the meaning of "one or more" such as "a body part", has the meaning of "one or more body parts".

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

What is claimed is:

1. A system to aid a visually impaired musician to learn musical notation, the system including:
   a microprocessor with a memory adapted to store the musical notation; and
   a plurality of transducers operatively attached to the microprocessor, wherein the transducers are in contact with a part of the body of the visually impaired musician, wherein responsive to the musical notation, the microprocessor is configured to signal the transducers to provide a tactile sensation to the part of the body of the visually impaired musician;
   wherein a musical note is represented and identified by producing a tactile sensation by a particular transducer at a specific location on a part of the body of the visually impaired musician distinct from the location on the part of the body of other transducers of the plurality of transducers.

2. The system of claim 1, wherein the part of the body of the visually impaired musician is a foot of the visually impaired musician.

3. The system of claim 1, wherein the part of the body is a foot and wherein the five toes of the foot correspond to the five lines of a musical staff.

4. The system of claim 2, wherein transducers are spatially distributed and located on a plurality of locations selected from a group of locations consisting of: on the tips of toes, under toes, on the top of toes, between toes, on an edge of the sole of a foot, on the sole of a foot, on the upper surface of the foot, on an ankle and on a lower leg below a knee.

5. The system of claim 1, wherein the part of the body of the visually impaired musician is selected from a group of body parts consisting: an arm, a foot, a leg, a toe, a head and a torso.

6. The system of claim 1, further comprising:
a camera operatively attached to the processor to input printed musical notes in the field of view of visually impaired musician, and to recognize and store the printed musical notes in a suitable format in the memory.

7. The system of claim 1, wherein the transducers are spatially located and held in place by a sock or a shoe adapted to be worn on a foot of the visually impaired musician.

8. The system of claim 1, further comprising a speaker, wherein the visually impaired musician hears the notes played out loud as represented by the musical notation.

9. The system of claim 1, further comprising a microphone, wherein the microphone is configured to record the playing of the visually impaired musician and to provide a subsequent feedback to the visually impaired musician.

10. The system of claim 9, wherein the subsequent feedback is selected from a group consisting of: an incorrect note, incorrect pitch of a note and incorrect note duration.

11. A method for a visually impaired person to learn musical notation by using a system which includes a microprocessor with a memory adapted to store the musical notation and a plurality of transducers operatively attached to the microprocessor, the method including the step of:
enabling attaching the transducers to be in respective contact with a plurality of locations on a body part of the visually impaired musician; and
enabling transducing of the musical notation into tactile sensations on the body part of the visually impaired musician; and
representing and identifying a musical note by producing a tactile sensation by a particular transducer at a specific location on a part of the body of the visually impaired musician distinct from the location on the part of the body of other transducers of the plurality of transducers.

12. The method of claim 11, further comprising:
said transducing on the body part at the respective locations while the system sounds the musical notation through a speaker or headphone operatively attached to the microprocessor, thereby accustoming the visually impaired musician to the tactile sensations corresponding to the musical notation.

13. The method of claim 11, further comprising:
transducing notes of first time interval;
monitoring sound of notes played by the visually impaired musician in response to the transducing;
waiting until the visually impaired musician finishes playing the notes of the first time interval before transducing notes of the next time interval.

14. The method of claim 11, wherein two hands are used to play the musical notation on a keyboard instrument, the method further comprising:
through a speaker or headphone operatively attached to the microprocessor, audibly sounding the notes played to the visually impaired musician which correspond to one hand.

15. The method of claim 14, during the sounding, transducing into tactile sensations on the body part of the visually impaired musician the music notation of the other hand.

16. The method of claim 11, further comprising:
selecting a segment of the music notation while looping repetitively to the beginning of the segment.

17. The method of claim 11, further comprising:
generating random musical notes with or without corresponding audible sound to train the visually impaired musician.

18. The method of claim 11, further comprising:
recording and storing sound being played by the visually impaired musician responsive to the transducing;
comparing the notes played by the visually impaired musician with the musical notation; and
providing audible or tactile feedback to the visually impaired musician responsive to the comparing.

19. The method of claim 18, wherein the feedback is selected from a group of notifications to the visually impaired musician consisting: an incorrect note, incorrect pitch of a note and incorrect note duration.

20. The method of claim 18, wherein the feedback is during the playing of the visually impaired musician or after the playing of the visually impaired musician.

* * * * *